United States Patent [19]
Herdzina

[11] 3,805,638
[45] Apr. 23, 1974

[54] POWER SYSTEM AND METHOD OF PROVIDING FLYWHEEL POWER TO ONE OR MORE ROTARY SHAFTS OPERATING IN TIMED RELATIONSHIP

[75] Inventor: Frank J. Herdzina, Schaumburg, Ill.

[73] Assignee: American Can Company, Greenwich, Conn.

[22] Filed: July 5, 1972

[21] Appl. No.: 269,066

[52] U.S. Cl.................... 74/572, 192/.02, 192/.098
[51] Int. Cl.............................................. G05g 1/00
[58] Field of Search....... 74/572; 192/105 C, 103 C, 192/.02, .098

[56] References Cited
UNITED STATES PATENTS

| | | | |
|---|---|---|---|
| 3,267,768 | 8/1966 | Drone et al. | 74/572 |
| 3,577,777 | 5/1971 | Whelam | 74/572 |
| 3,665,788 | 5/1972 | Nyman | 74/572 |
| 600,446 | 3/1898 | Pole | 74/572 |

Primary Examiner—Benjamin W. Wyche
Assistant Examiner—Wesley S. Ratliff, Jr.
Attorney, Agent, or Firm—Robert P. Auber; Paul R. Audet; Harries A. Mumma, Jr.

[57] ABSTRACT

A power system and method for providing power from flywheel means to at least one of a plurality of commonly-driven continuous motions rotary shaft means operating in a timed relationship. The rotary shaft means drive their respective flywheels. While the flywheel means are not engaged to their respective rotary shaft means, main drive means commonly, drivingly-rotate the rotary shaft means and subsidiary drive means drivingly-rotate the flywheel means up to substantially the same speed. When they are at substantially the same speed, the flywheel means are clutchingly engaged to their respective rotary shaft means without slippage and without loss of the timed relationship between the plurality of rotary shaft means. Rotation of the rotary shaft means can be stopped without loss of timing or damage, by clutchingly disengaging the flywheel means from its rotary shaft means and braking the main drive means.

11 Claims, 2 Drawing Figures

PATENTED APR 23 1974  3,805,638

POWER SYSTEM AND METHOD OF PROVIDING FLYWHEEL POWER TO ONE OR MORE ROTARY SHAFTS OPERATING IN TIMED RELATIONSHIP

BACKGROUND OF THE INVENTION

This invention relates to power systems employing a flywheel for storing energy and transferring it upon demand to one of a plurality of continuous motion rotary shafts for doing work. More particularly, this invention relates to such power systems wherein the rotary shafts are commonly driven and operate in a timed relationship.

As is well know, flywheels store energy and supply it on demand to working members of power systems. They are often clutchingly engaged to rotary shafts to provide them with start-up or additional rotational speed or power. For example, driven, rotating flywheels have been clutchingly engaged to input crankshafts of engines to turn them over rapidly, and they have been driven at predetermined speeds greater than that of their crankshafts to provide the crankshafts with extra power requisite for accelerating their rotational speed and for enabling them to handle heavy work loads during a portion of their total rotation.

One of the most common applications of flywheels is in relation to drive systems of various types of mechanical presses wherein they can be driven by a motor and used as a major source of energy during the working portion of the total press stroke. For example, for a press for stamping metal, very little horsepower is required during most of the stroke to lower and raise the stamping member to and from the metal workpiece, but a large amount is needed during the short, stamping portion of the stroke. Thus, whereas often only about 4 hp. is needed to drive the shaft say 330° of its rotation during the lowering and raising actions, about 10 hp. is needed to drive it 30° of its rotation during stamping. In such an application, a 4 hp. motor is all that would be required for the stamping operation if a flywheel were employed to supply the shaft with the extra 6 hp. needed during 30° of shaft rotation.

When a flywheel is employed in the aforementioned manner to provide horsepower during the working portion of a stroke, its speed of rotation diminishes. Means such as a motor is usually employed to restore the lost energy to the flywheel and to bring it back up to its previous speed.

Heretofore, as in the aforementioned applications, conventional power systems utilizing flywheels have been characterized by the fact that the flywheel has been used to drive the working member or rotary shaft. A motor is used to drive the flywheel. When work is to be done, the flywheel is clutchingly engaged to and thereafter drives the rotary crankshaft. Driving a rotary shaft with a flywheel in this manner has proven problematical in power systems wherein one or more flywheels are each respectively connectable to one or more of a plurality or rotary shafts which operate in timed relationship. An example of such a power system is a multi-station punch press wherein separate, timed actions are performed at each work station on individual workpieces such as blanks for making container end closures, which are successively, intermittently and timedly passed — to a first work station where a press pierces an aperture in the blank or end, draws flanges into and stamps a bead in the end, — to a second work station where a plug is inserted into the aperture, — to a third station where the plug is partially crimped to the end, and — to a fourth station where the plug is fully and finally secured to the end. Each operation at each press is effected simultaneously so that many workpieces can be worked in a short period of time. In the aforementioned exemplary power system, only the crankshaft of the press which pierces an aperture in the blanks has a flywheel connected thereto, since only this crankshaft requires a great amount of energy during a limited portion of its rotation.

In such power systems wherein, say, one flywheel drives one of the plurality of crankshafts operating in timed relationship, there are problems because when the rotating flywheel is clutchingly engaged to a crankshaft, there is slippage. This undesirably causes the rotation of that crankshaft to be out of time or synchronism with the rotation of the rest of the crankshafts of the system. The more flywheels used, the more slippage there is and the more difficult it is to clutchingly engage each flywheel to each respective crankshaft at precisely the same time. Also, when more than one flywheel is used to drive more than one respective crankshaft, it is difficult to brake the flywheels to stop the rotation of all of the crankshafts at the same time to prevent damage. An additional disadvantage is that large gear trains are often needed to transfer power from the main drive motor to the crankshafts.

The power system and apparatus of this invention overcomes the above problems and disadvantages because contrary to conventional systems, the crankshaft is used to drive the flywheel. There is no slippage and no loss of timed relationship of any of the crankshafts when the flywheel or flywheels are engaged to their respective crankshafts. Because a braking system is applied to the main drive means for example to the main drive motor or main gear, all crankshafts are stopped at the same time without slippage or chance damage. Further, smaller gear trains can be used between the main drive motor and the crankshafts because less power is transferred therethrough. The additional horsepower required during a small portion of the stroke is now provided by the flywheel.

It is a primary object of this invention to provide the aforementioned advantages and others which will become more apparent later, when the description of the invention is read and understood in conjunction with the drawing.

BRIEF SUMMARY OF THE INVENTION

This invention is in a method and power system for providing power on demand from flywheel means engageable with at least one of a plurality of commonly driven rotary shaft means operating in timed relationship for effecting work. The power system comprises common main drive means which can include a main drive motor and a main gear for commonly driving the plurality of rotary shaft means to rotate them in timed relationship at a certain speed; subsidiary drive means such as a motor for separately driving and rotating the flywheel means associated with but not drivingly engaged with the rotary shaft means, at substantially its respective associated same speed of rotation as that of the rotary shaft means; coupling means such as a clutch for selectively engaging the flywheel means with and disengaging it from the subsidiary drive means; and, coupling means such as a clutch for selectively engaging and driving the flywheel means with and by means of its respective associated rotary shaft means to engagingly rotate the flywheel means and the rotary shaft means at substantially the same speed. When more than one flywheel is employed, each is engageable with an individual one of the plurality of rotary shaft means.

The method comprises driving the plurality of rotary shaft means with the common main drive means to rotate all of the rotary shaft means in timed relationship; separately driving the flywheel means with the subsidiary drive means while the flywheel means is associated with but not drivingly engaged with the rotary shaft means, to drive and rotate each flywheel means at substantially the same speed as that of its respective associate rotary shaft means; disengaging the flywheel means from the subsidiary drive means; and, engaging each of the flywheel means with the its respective associated rotary shaft means to engagingly rotate its associated flywheel means and the rotary shaft means at substantially the same speed, thereby to utilize the rotary shaft means to drive its flywheel means and to provide power on demand from each flywheel means to its respective associated rotary shaft means for doing work with the rotary shaft means, without destroying the timed relationship or operation of all of the commonly driven rotary shaft means. Preferably, the flywheel means is engaged to its respective rotary shaft means at substantially the same time that the main drive means is engaged with the rotary shaft means.

DETAILED DESCRIPTION OF THE DRAWING

Figure 1:
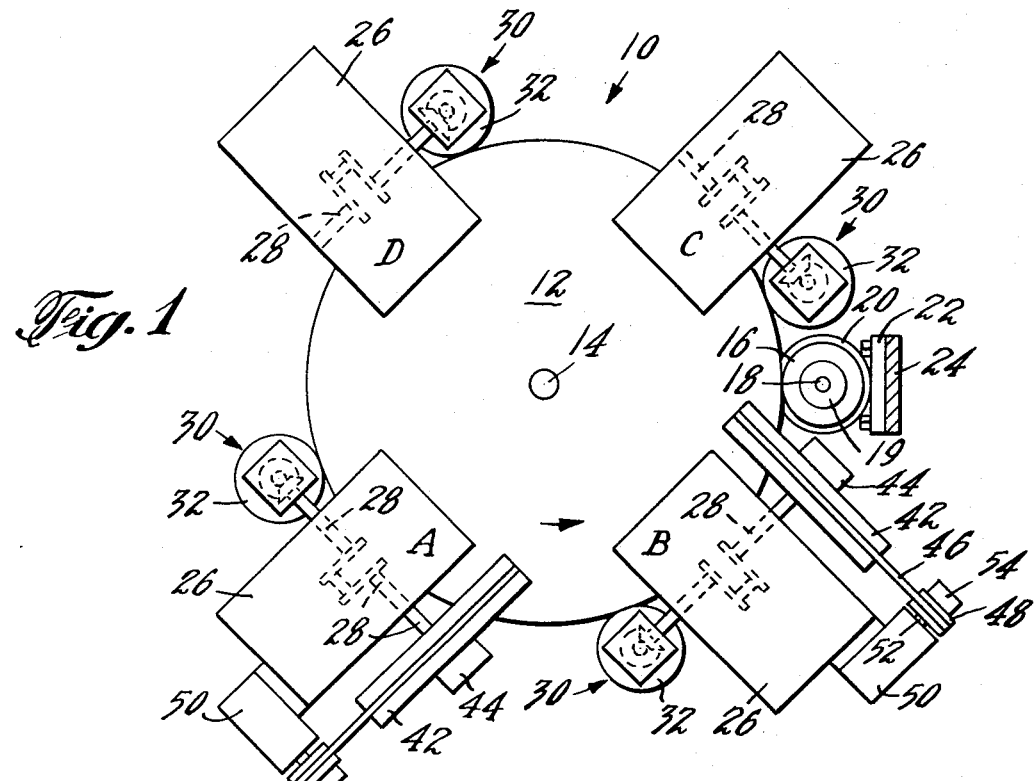
FIG. 1 is a top plan view of an embodiment of the power system of this invention.

Referring to the drawing in detail, FIG. 1 shows a power system generally designated 10, comprising main drive means, here shown to include a main gear such as a bull or sun gear 12, rotatably mounted on shaft 14 and driven by pinion gear 16 engageable by coupling means such as clutch-brake 19 on shaft 18. Main gear 12 is driven by main drive motor 20 having a base 22 by which it is fastened to a supportive surface such as a wall 24. FIG. 1 shows that power system 10 also includes work stations such as press frames 26 radially and peripherally mounted on main gear 12 and having crankshafts 28 commonly driven by the common main gear through gear trains generally designated 30. Press frames 26 respectively have flywheels 42 rotatably mounted on their respective associated crankshafts 28 and drivingly engageable therewith by coupling means such as flywheel clutches 44. Flywheels 42 are driven through belts 46 mounted on pulleys 48, by subsidiary drive means such as auxiliary motors 50. Pulleys 48 are rotatably mounted on shafts 52 and are drivingly engageable therewith by coupling means such as auxiliary motor clutches 54.

Figure 2:
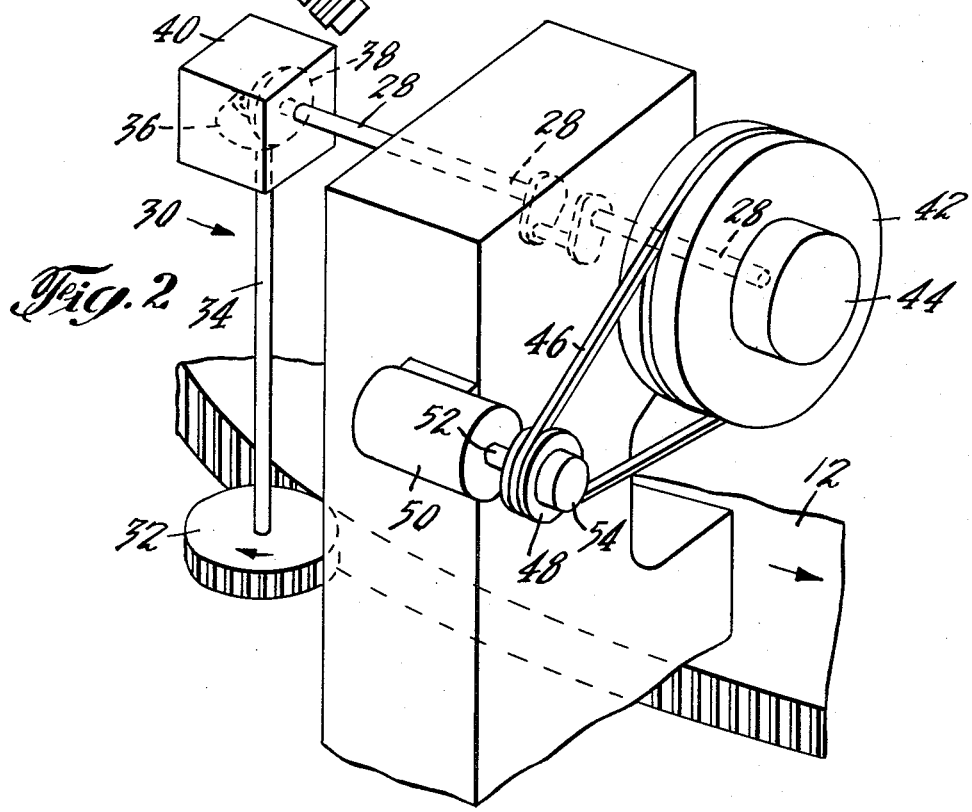
FIG. 2 is an enlarged perspective view of the lower left work station punch press shown in FIG. 1.

FIG. 2 is an enlarged perspective view of work station or press frame 26 mounted on the lower left portion of main gear 12 of FIG. 1. More particularly, FIG. 2 shows that the gear train generally designated 30 in FIG. 1 includes pinion gear 32 which drives, through stub shaft 34 spiral miter gears 36 and 38 encompassed within right angle gear box 40. As main gear 12 is driven by motor 20 in a counterclockwise direction, pinion gear 32, stub shaft 34 and spiral miter gear 36 are driven to rotate in a clockwise direction, this rotary motion being transferred through spiral miter gear 38 to crankshaft 28 whose rotary motion can in turn be transferred and changed into vertically reciprocating punch motion by means of a substantially vertical connecting rod (not shown), in turn connected to a punch of a die (not shown). It is to be noted that the main drive means, including main drive motor 20, common main gear 12 and gear train 30, similarly drives each crankshaft 28 of each of the other press frames 26, and that each crankshaft 28 is driven in a timed relationship so that work being done at each staion is done in timed relationship.

The method of providing power on demand from one or more flywheels to their respective associated, commonly driven rotary shafts for effecting work at a plurality of work stations involves first, assuring that flywheels 42 are not clutchingly engaged to their respective crankshafts 28. Once this is established, main drive motor 20 and auxiliary drive motors 50 can be started, preferably, simultaneously. Once the motors are started, main drive motor clutch-brake 19 and auxiliary motor clutches 54 are engaged, preferably simultaneously. The engaging of clutchbrake 19 drives main gear 12 which commonly drive gear trains 30 and thereby drivingly rotates crankshafts 28. The engaging of auxiliary motor clutches 54 drivingly rotates flywheels 42 through belts 46. Preferably, auxiliary motors 50 drive flywheels 42 so that they are rotating at substantially the same speed as the respective crankshafts 28. When crankshafts 28 and flywheels 42 are rotating preferably at substantially the same speed, auxiliary motor clutches 54 are disengaged, preferably at substantially the same time that flywheel clutches 44 are engaged. This action clutchingly engages flywheels 42 to their respective associated crankshafts 28, allows main motor 29 and main gear 12 to crankshafts 28 in timed relationship, and allows crankshafts 28 to drive their respective flywheels 42. Now, power losses in the flywheel, say during the aforementioned working portion of the press stroke, are restored to the flywheel by its crankshaft. An auxiliary motor is therefore not needed as in conventional systems, for restoring the lost power to the flywheel during working operation of the system.

Because respective associated flywheels 42 and crankshafts 28 are rotating at substantially the same speed when they are clutchingly engaged to each other according to the method of this invention, there is no slippage involved and no loss of the timing relationship between any of the crankshafts at any of the work stations. The speed at which crankshafts 28 are rotated can be any suitable speed such as their normal work operating speed. When it is desired to tie flywheels 28 to their respective associated crankshafts at substantially the same time as, or shortly after, clutch-brake 19 is engaged, it has been found advantageous to account for start-up lag in the crankshaft speed, and use auxiliary motors 50 to bring flywheels 42 up to a speed that compensates for the lag and still substantially matches the crankshaft speed. For example, when the crankshaft lag is about 5 percent less than its normal work operating speed, the flywheel is rotated to match that speed. The main drive means then brings both the crankshaft and the flywheel up to normal work operating speed.

To stop the rotation of crankshafts 28 of the power system of this invention, a braking system can be applied to the main drive means. Although any suitable conventional braking means can be employed it has been found advantageous to disengage flywheel clutches 44 to render flywheels 42 free-wheeling while simultaneously disengaging the clutch mechanism of clutch-brake 19 and engaging its brake mechanism. This action brakes and stops the rotation of main gear 12 and simultaneously stops rotation of each of the crankshafts 28 without damage at one or more of the work stations or punch presses 26. Preferably, simultaneously with the disengaging of clutches 44 and 19, clutches 54 can be engaged to tie pulleys 48 to auxiliary motors 50, which preferably are left running, to keep flywheels 42 rotating. When main drive motor clutch 19 is again engaged and crankshafts 28 are rotating at the desired speed, flywheel clutches 44 can again be engaged to, as before, tie flywheels 42 to their respective crankshafts, and, clutches 54, again, disengaged from motors 50.

It is to be understood that the power system shown in FIGS. 1 and 2 of the drawing, and the previous discussion of the method of operating the power system are exemplary of merely one system and method wherein there is utilized the concept of employing a flywheel to provide power on demand to one of a plurality of crankshafts operating in timed relationship without loss of timed relationship between any of the crankshafts having or not having respective flywheels.

The power system and method of this invention can be employed in relation to any power system or mechanism utilizing the power of a flywheel to, in some manner assist, on demand, in effecting the rotation of one or more of a plurality of rotary shafts operating in timed relationship for doing work. Typical of such power systems wherein this invention can be used are the variety of mechanisms such as punch presses generally utilized for example for cutting, piercing, drilling, stamping, molding, joining, pressing, sealing, treating, decorating or otherwise working materials, especially workpieces which are indexedly, intermittently or timedly fed to the mechanisms or presses. The power system shown in FIG. 1, is one such power system wherein a plurality of presses which can be any conventional commercial or specially designed presses or mechanisms, are arranged and employed for converting a series of workpieces such as metal blanks into container end closures suitable for being doubled seamed onto one or two piece can bodies. A series of individual metal blanks are successively timedly fed to a first work station A, wherein a punch press 26, having flywheel 42, clutchingly engageable with its crankshaft 28 in turn having a working member connectable thereto, (not shown), pierces an aperture in the blank. The pierced blank or end is then passed to a second work station, B, wherein a punch press draws a flange and stamps a bead into the end. At the third work station, C, a metal plug is inserted into and preliminarily crimped to the end, and, at the fourth work station, D, the plug is finally and completely secured to the end to complete the conversion of the original metal blank to a finished container end closure suitable for being double seamed to a container body. Each operation at each work station or press is effected at the same time so that the blanks can be converted rapidly.

It is to be noted that in the aforementioned power system shown in FIG. 1, as in any other power system with which this invention may be employed, the number of flywheels which can be used can vary. For example, in the aforementioned system, if the piercing, flanging and beading operations were all done at work station A, a flywheel would be employed only with the crankshaft of work station A. If, on the other hand, the workpiece required heavy work during a portion of the stroke at each punch press, a flywheel would be employed with the crankshaft of each work station. Thus, depending for example on the workpiece being worked, and type of work being effected at each station, a flywheel could be employed with one, a combination or all of the timedly-operating crankshafts.

It is also to be noted that the power systems with which this invention may be employed need not have its working stations arranged in a circular manner. They can be arranged in one overall unit or in any configuration, in any plane or direction. For example, they can be radially arranged in one unit to simultaneously work a single workpiece passed therebetween, for example for simultaneously boring holes into opposite sides of a V-8 engine block, or they can be arranged in a straight or rectangular configuration. Accordingly, there could be employed one crankshaft or any suitable combination or configuration of line and/or jackshafts. The main drive means need not include a main drive gear such as bull gear 12. It can comprise and include any suitable means for positively, commonly driving the plurality of rotary shafts of the system in timed relationship. Thus, as the main drive means, any suitable gear train, chain sprocket, timing pulley and sheave, or cog belt arrangement could be employed with any configuration of line and/or jackshafts. It can be seen then that the main drive means therefore can comprise or include any suitable means, for transferring power from the main drive means commonly to the rotary shafts, which in turn can be any one or combination of eccentrics, cranks or cams depending on the motion required to do the given job.

The subsidiary drive means can be any means for driving and supplying energy to the flywheel in sufficient amounts to rotate the flywheels at a given speed in a given time as determined by the requirements of the given system. Thus, the subsidiary drive means can for example be a small D.C., constant or variable speed electric motor.

Flywheels which can be employed in accordance with the power system and method of this invention can include any flywheel having sufficient mass and rotatability to store the energy which will be demanded from its respective working member in the system.

I claim:

1. A method of providing power on demand from flywheel means engageable with at least one of a plurality of commonly-driven continuous motion rotary shaft means operating in timed relationship for effecting work which comprises:

driving the plurality of rotary shaft means with common main drive means to continuously rotate all of the rotary shaft means in timed relationship, driving with subsidiary drive means, flywheel means associated with but not drivingly engaged with the rotary shaft means, to drive and rotate each flywheel means at substantially the same speed as that of its respective associated rotary shaft means, the flywheel means from the subsidiary drive means, engaging the flywheel means with its respective associated rotary shaft means to continuously engagingly rotate the flywheel means and its associated rotary shaft means at substantially the same speed, thereby to utilize the rotary shaft means to drive its flywheel means and to provide power on demand from each flywheel means to its respective associated rotary shaft means for doing work with the rotary shaft means without destroying the timed relationship of all of the commonly-driven continuous motion rotary shaft means.

2. The method of claim 1 wherein said engaging of the flywheel means to its respective associated rotary shaft means is effected at substantially the same time that said main drive means is engaged with the rotary shaft means.

3. The method of claim 1 wherein the flywheel means includes one flywheel engageable with one of the plurality of the rotary shaft means.

4. The method of claim 3 wherein said engaging of the flywheel to the rotary shaft means is effected at substantially the same that said main drive means is engaged with the rotary shaft means.

5. The method of claim 1 wherein the flywheel means includes more than one flywheel each of which is engageable with an individual one of the plurality of rotary shaft means.

6. A power system for providing power on demand from flywheel means engageable with at least one of a plurality of commonly-driven continuous motion rotary shaft means operating in timed relationship for effecting work which comprises:
rotary shaft means,
flywheel means associated with but not drivingly engaged with the rotary shaft means,
main drive means for commonly driving the plurality or rotary shaft means to continuously rotate the rotary shaft means in timed relationship,
subsidiary drive means for separately driving and rotating the flywheel means at substantially the same speed of rotation as its respective associated rotary shaft means,
coupling means for selectively engaging the flywheel means with and disengaging it from the subsidiary drive means, and
coupling means for selectively engaging and driving the flywheel means with and by means of the commonly driven rotary shaft means to continuously engagingly rotate the flywheel means and its respective associated rotary shaft means at substantially the same speed, to provide power on demand from each flywheel means to its respective rotary shaft means for doing work with the rotary shaft means without destroying the timed relationship of all of the commonly-driven continuous motion rotary shaft means.

7. The power system of claim 6 wherein said main drive means includes a bull gear and means for driving said bull gear, said bull gear being used to commonly drive each of said rotary shaft means, and wherein each of said coupling means includes selectively operable clutch means for respectively drivingly engaging and disengaging each of said subsidiary and main driving means with said flywheel means.

8. The power system of claim 6 wherein said flywheel means includes one flywheel engageable with one of the plurality of said rotary shaft means.

9. The method of claim 8 wherein said main drive means includes a bull gear and means for driving said bull gear, said bull gear being used to commonly drive each of said rotary shaft means in timed relationship, and wherein each of said coupling means includes selectively operable clutch means for respectively drivingly engaging and disengaging each of said subsidiary and main driving means with said flywheel means.

10. The power system of claim 6 wherein said flywheel means includes more than one flywheel, each of said flywheels being engageable with an individual one of said plurality of rotary shaft means.

11. The method of claim 10 wherein said main drive means includes a bull gear and means for driving said bull gear, said bull gear being used to commonly and synchronously drive each of said rotary shaft means in timed relationship, and, each of said coupling means includes selectively operable clutch means for respectively drivingly engaging and disengaging each of said subsidiary and main driving means with said flywheel means.

* * * * *

UNITED STATES PATENT OFFICE
CERTIFICATE OF CORRECTION

Patent No. 3,805,638     Dated April 23, 1974

Inventor(s)  Frank J. Herdzina

It is certified that error appears in the above-identified patent and that said Letters Patent are hereby corrected as shown below:

Column 7, in the second printed line of claim 1, before "the flywheel" insert -- disengaging --, and after the comma ",", insert -- and --.

Signed and sealed this 24th day of September 1974.

(SEAL)
Attest:

McCOY M. GIBSON JR.
Attesting Officer

C. MARSHALL DANN
Commissioner of Patents